United States Patent [19]
Rickard

[11] Patent Number: 5,726,980
[45] Date of Patent: Mar. 10, 1998

[54] TIME DIVISION DUPLEX COMMUNICATIONS REPEATER

[75] Inventor: Robin Paul Rickard, Bishop's Stortford, United Kingdom

[73] Assignee: Northern Telecom Limited, Montreal, Canada

[21] Appl. No.: 620,413

[22] Filed: Mar. 22, 1996

[30] Foreign Application Priority Data

Mar. 30, 1995 [GB] United Kingdom ............... 9506507

[51] Int. Cl.⁶ .................. H04B 3/58; H04L 5/26; H04L 25/52
[52] U.S. Cl. .............. 370/293; 370/294; 370/501; 375/214; 455/5.1; 455/16; 455/20
[58] Field of Search ................ 370/279, 280, 370/293, 294, 492, 501; 375/211, 214; 379/338, 341, 343, 344; 455/5.1, 6.1, 7, 14, 15, 16, 20

[56] References Cited

U.S. PATENT DOCUMENTS 3,835,393 9/1974 Marron ........................ 370/293
3,911,415 10/1975 Whyte ........................ 340/310 A
3,962,635 6/1976 Roza ........................... 370/501
4,766,606 8/1988 Bardutz et al. ............... 370/293
5,377,255 12/1994 Beasley ....................... 370/279

FOREIGN PATENT DOCUMENTS 0 238 813   9/1987   European Pat. Off. .
WO 94/01941  1/1994   WIPO .

*Primary Examiner*—Alpus H. Hsu
*Attorney, Agent, or Firm*—Lee, Mann, Smith, McWilliams, Sweeney & Ohlson

[57] ABSTRACT

A repeater for use with Time Division Duplex (TDD) communications such as CT2 delivered over mains electricity cables. The repeater is coupled to a mains cable via a branch (the cable is not broken) and in alternate TDD phases converts signals from $f_1 \to f_2$ or $f_2 \to f_1$ and amplifies them. A clock signal to control timing of the conversion step is derived from a dedicated channel, a tone, or a call in progress. A regenerator function may be combined with the repeater.

12 Claims, 5 Drawing Sheets

TIME DIVISION DUPLEX COMMUNICATIONS REPEATER

This invention relates to a repeater for use in a cabled telecommunications system.

BACKGROUND OF THE INVENTION

Telecommunications signals are attenuated by the transmission lines over which they are carried. Repeaters are widely used to boost the level of signals on long cable runs and are placed periodically along a cable.

Usually, repeaters are inserted in the cable, the repeater having an input port for coupling to a cable bearing a weak signal, and an output port for coupling to a cable bearing the amplified signal for onward transmission. Repeaters may amplify signals travelling in both directions along a cable.

It is proposed to deliver telecommunications signals over existing mains electricity cables such that an electricity supply and telecoms signals are carried over a single mains cable. Conventional repeaters cannot be used with such a system for a number of reasons. Firstly, to use a conventional repeater in series with the cable it is necessary to use an RF block to prevent incoming telecoms signals to the repeater from continuing along the cable on the other side of the repeater. It is difficult and costly to provide an RF choke which can withstand the expected current on a mains cable. Secondly, installing a repeater in existing mains cables requires a severing of the mains cable and the associated disruption to consumers' electricity supply.

U.S. Pat. No. 3,911,415 discloses a power line communication system having a number of frequency-translating repeaters. Communication in forward (interrogation) and reverse (response) directions is possible by providing repeaters with two separate sets of receiver-transmitter pairs, one set for each direction of communication. This requires four separate sets of operating frequencies and an undesirably large amount of equipment.

Furthermore, it is now proposed to use a time division duplex (TDD) technique to deliver telecoms signals over a transmission line, with transmission to a subscriber and reception from a subscriber over one of a number of single frequency bearer channels. This causes further problems for the repeater design.

The object of the present invention is to provide a repeater for use with time-division duplex communication schemes which minimises or overcomes the problems of the prior art repeaters.

SUMMARY OF THE INVENTION

According to the present invention there is provided a method of amplifying signals passing along a transmission line at a carrier frequency comprising the steps of:
- tapping the signals from the line;
- converting the tapped signals to a different carrier frequency;
- amplifying the converted signals;
- coupling the amplified signals to the line for onward transmission at said different carrier frequency;

wherein the signals are time division duplex signals which flow upstream and downstream along the line in alternate time periods, and wherein in the alternate periods the tapped signals are converted from a first to a second carrier frequency and from the second to the first carrier frequency.

According to another aspect of the present invention there is provided a repeater for use in a cabled communications system having a transmission line to carry signals, the repeater comprising:
- tapping means to tap signals at a carrier frequency from the line;
- converting means for converting the tapped signals to a different carrier frequency;
- an amplifier arrangement to amplify the converted signals, and;
- means for coupling the amplified signals to the line for onward transmission at said different carrier frequency;

wherein the signals are time division duplex signals which in alternate time periods flow upstream and downstream along the line and in the alternate time periods the converting means converts the tapped signals from a first to a second carrier frequency and from the second to the first carrier frequency.

Preferably a clock signal is extracted from the tapped signals, the clock signal relating to the upstream and downstream flows and being used to control timing of the converting step.

Preferably the conversion between carrier frequencies is via an intermediate frequency (IF) at which the clock signal is extracted.

The tapped signals may comprise a band of channels, at least one of the channels conveying timing information from which the clock signal is extracted. Alternatively, the tapped signals can comprise a band of channels supporting calls and the clock signal is extracted from one of the calls.

A plurality of repeaters may be arranged in cascade along the transmission line, each repeater converting between two carrier frequencies chosen from a set of frequencies. This set of frequencies may be re-used along the transmission line with further arrangements of repeaters. A regenerator function may be provided in the repeater.

Preferably the transmission line is an electricity distribution cable which carries both telecommunications signals and an electricity supply.

DESCRIPTION OF THE PREFERRED EMBODIMENTS

The described embodiments use a time division duplex (TDD) format called CT2 but it will be appreciated that other TDD formats such as DECT could be used.

Figure 1:
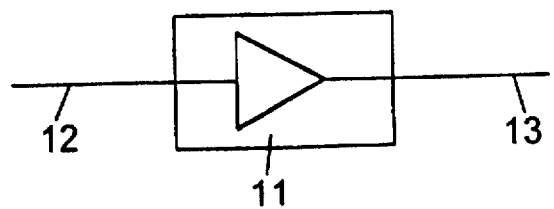
FIG. 1 schematically shows a conventional telecommications repeater.

Referring to FIG. 1, this shows a conventional repeater 11 with an input signal $S_{in}$ and amplified output signal $S_{out}$. Both $S_{in}$ and $S_{out}$ can use the same frequency or frequency band because cable sections 12 and 13 are isolated from each other by inserting the repeater 11.

Figure 2:
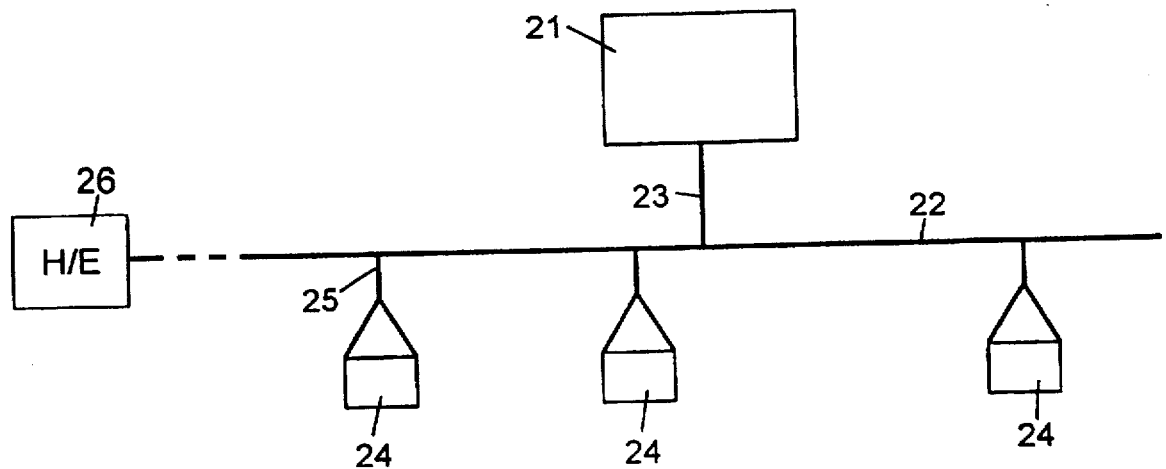
FIG. 2 schematically shows a repeater used according to an embodiment the present invention.

FIG. 2 shows a repeater as used in accordance with the invention. Mains electricity cable 22 carries an electricity supply and telecoms signals from a head-end 26 to subscribers 24 who are equipped with suitable apparatus to separate the mains and telecoms signals. A single branch 23 connects repeater 21 to the cable 22 without needing to break cable 22. This branch may be a single or three-phase service cable which is specially constructed or a tap from a service cable which already exists (such as service cable 25 to a subscriber's premises or a service cable to a street lamp). Repeater 21 receives and re-transmits only telecoms signals to and from the branch 23. This is achieved by placing one or preferably two capacitors and a fuse in series with the repeater and an inductor coupled to the neutral conductor. The capacitors pass only the high frequency (telecoms) signals and the fuse protects the repeater should the capacitors fail.

Because cable 22 has not been broken, it is not possible for a repeater to simply receive weak signals, amplify them and feed them back to the cable as the amplified signals would interfere with the weak signals. The repeater therefore translates the incoming signals to a different frequency band and then returns them to the cable.

Figure 3:
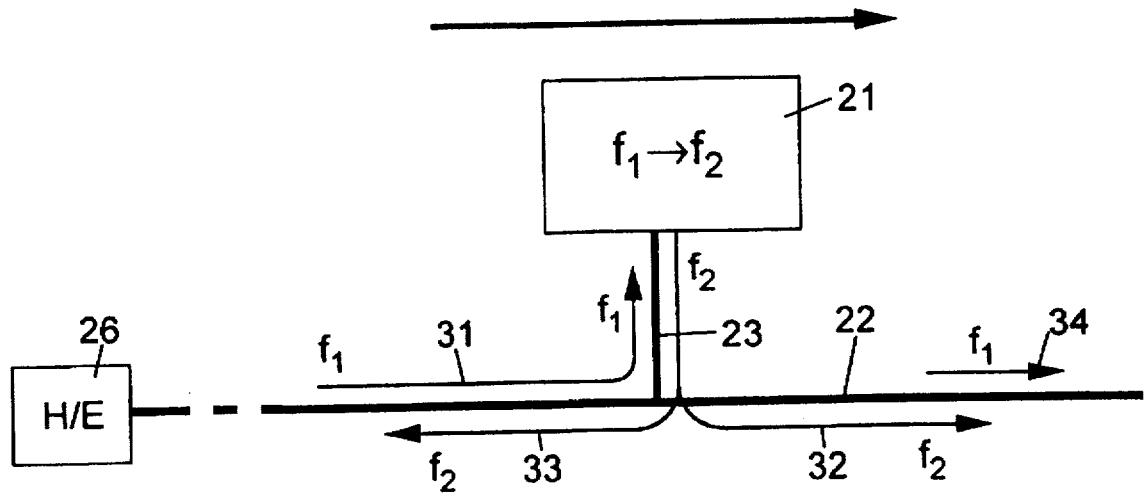
FIGS. 3 and 4 show the repeater of FIG. 2 in operation.

FIG. 3 shows the passage of signals downstream from head-end 26 towards subscribers. Signal 31 occupying frequency band $F_1$ arrives at repeater 21 via branch 23. The repeater 21 translates the signal to a new frequency band $F_2$, amplifies it, and feeds it back to cable 22. The amplified signal propagates in both directions 32,33 along cable 22 to serve subscribers within reach of the repeater. The frequency translation step ensures that the amplified signal 32,33 (at $F_2$) does not interfere with the weaker signal 31,34 (at $F_1$). It is preferred that frequency band $F_1$ is used for the head-end to repeater link and frequency band $F_2$ for the link from the repeater to the subscribers. Another possibility is to use band $F_1$ both for the head-end to repeater link and to serve subscribers located near to the head-end, and to use band $F_2$ for the link from the repeater to the remaining subscribers. The former method is preferred as it allows a single model of subscriber's terminal to be used.

Figure 4:
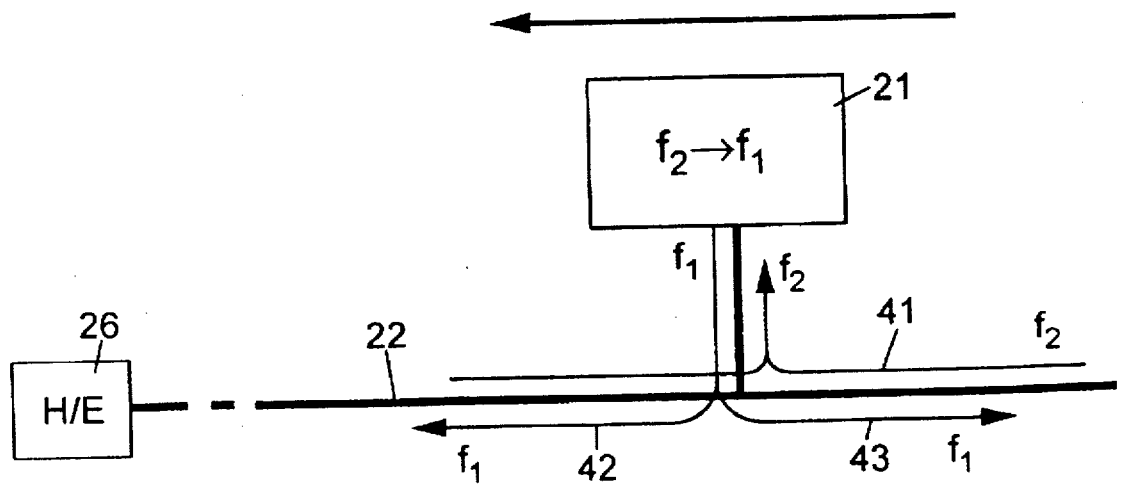

In a time division duplex system, telecom signals are alternately transmitted and received on the same channel. Repeater 21 therefore must alternately translate from $F_1 \rightarrow F_2$ during the head-end transmit phase, and translate from $F_2 \rightarrow F_1$ during the head-end receive phase. FIG. 4 shows the passage of a signal 41 returning towards the head-end. This is a reversal of the process shown in FIG. 3. Incoming weak signal 41 at $F_2$ (from subscribers located either direction along cable 22) is received by repeater 21, translated to frequency band $F_1$, amplified, and returned to the cable. The amplified signal at $F_2$ propagates along cable 22 in both directions 42 and 43 but does interfere with the weaker signal 41 at $F_1$.

is important that the alternate translations from $F_1 \rightarrow F_2$ and $F_2 \rightarrow F_1$ are in synchronism with the transmit and receive phase of signals passing along the cable. A clock signal is derived from the telecoms signal to control the timing of this switching function.

Figure 5:
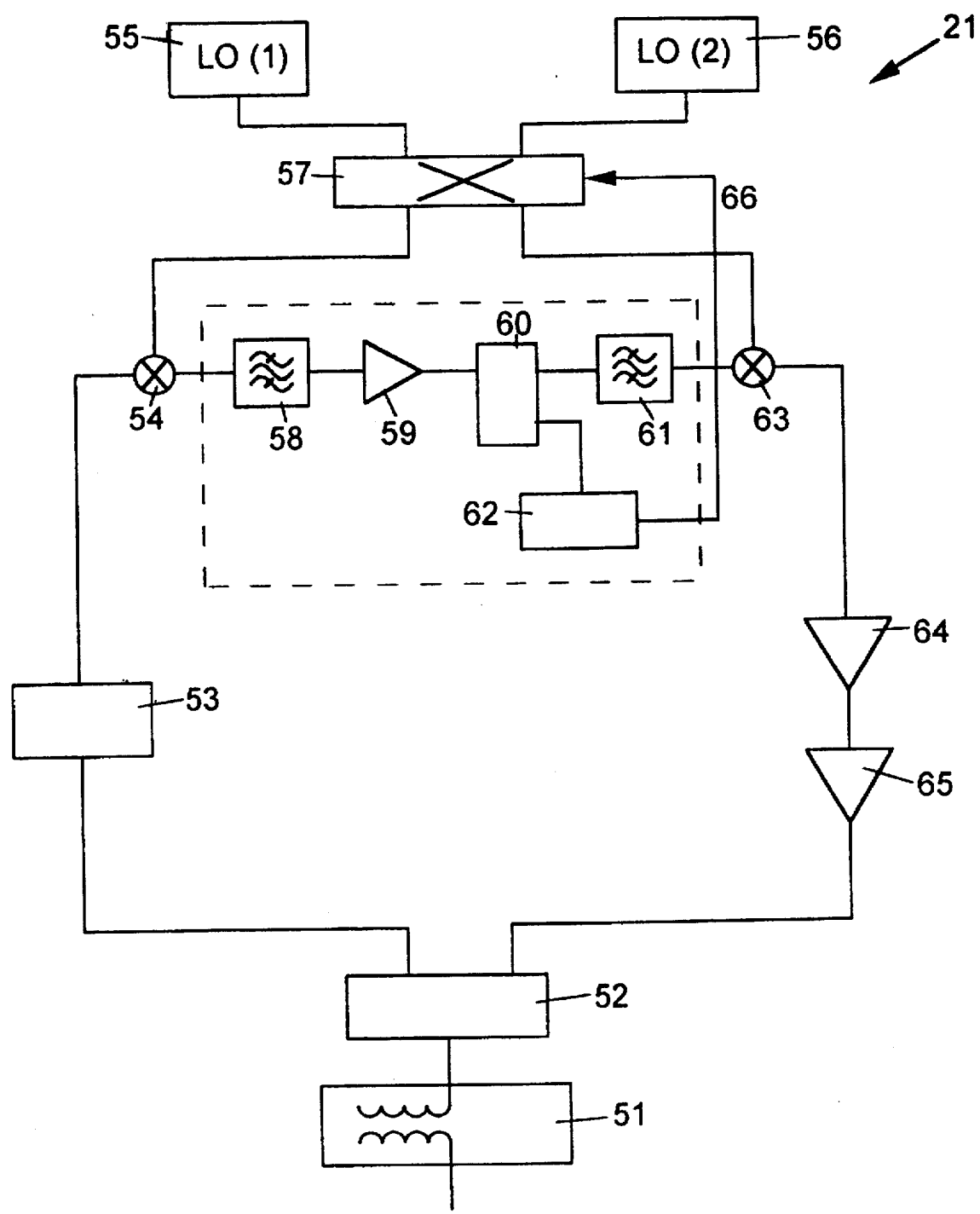
FIG. 5 shows the repeater of FIG. 3 in more detail.

FIG. 5 shows one embodiment of repeater 21 in more detail and explains the clock extraction process. Telecoms signals tapped from the cable 22 pass through an impedance matching circuit 51 and a splitter 52. An attenuator 53 may be provided to prevent compression in the following mixer stages and also to protect the input stages from reflections when there is a mis-match between the repeater and the branch. The signal band is mixed 54 with one of two oscillator signals supplied by sources 55, 56 to translate the signal band to an intermediate frequency (IF) of 864–868 MHz, i.e. the standard CT2 frequency band. This IF band is amplified 59, to compensate for losses in the filters, and split 60 to feed a standard CT2 terminal 62. This terminal extracts the clock signal 66 (for CT2 this is at 500 Hz) for switching 57 the local oscillator signals in synchronism with the time division duplex signal. A second mixer 63 translates the signal band down to the other of the cable frequency bands (i.e. different to the frequency band of the incoming signal). The translated signal is amplified 64, 65 and returned to mains cable 22 via combiner 52 and matching circuit 51.

A two stage conversion to the IF may be preferred to provide better rejection of the unwanted frequency bands.

The switching function may be achieved in several ways. In the arrangement shown in FIG. 5 local oscillators 55,56 each provide a fixed frequency and the clock signal 66 operates switch 57 to alternately:

connect LO(1) 55 to mixer 54, LO(2) 56 to mixer 63; and, connect LO(1) 55 to mixer 63, LO(2) 56 to mixer 54.

Figure 6:
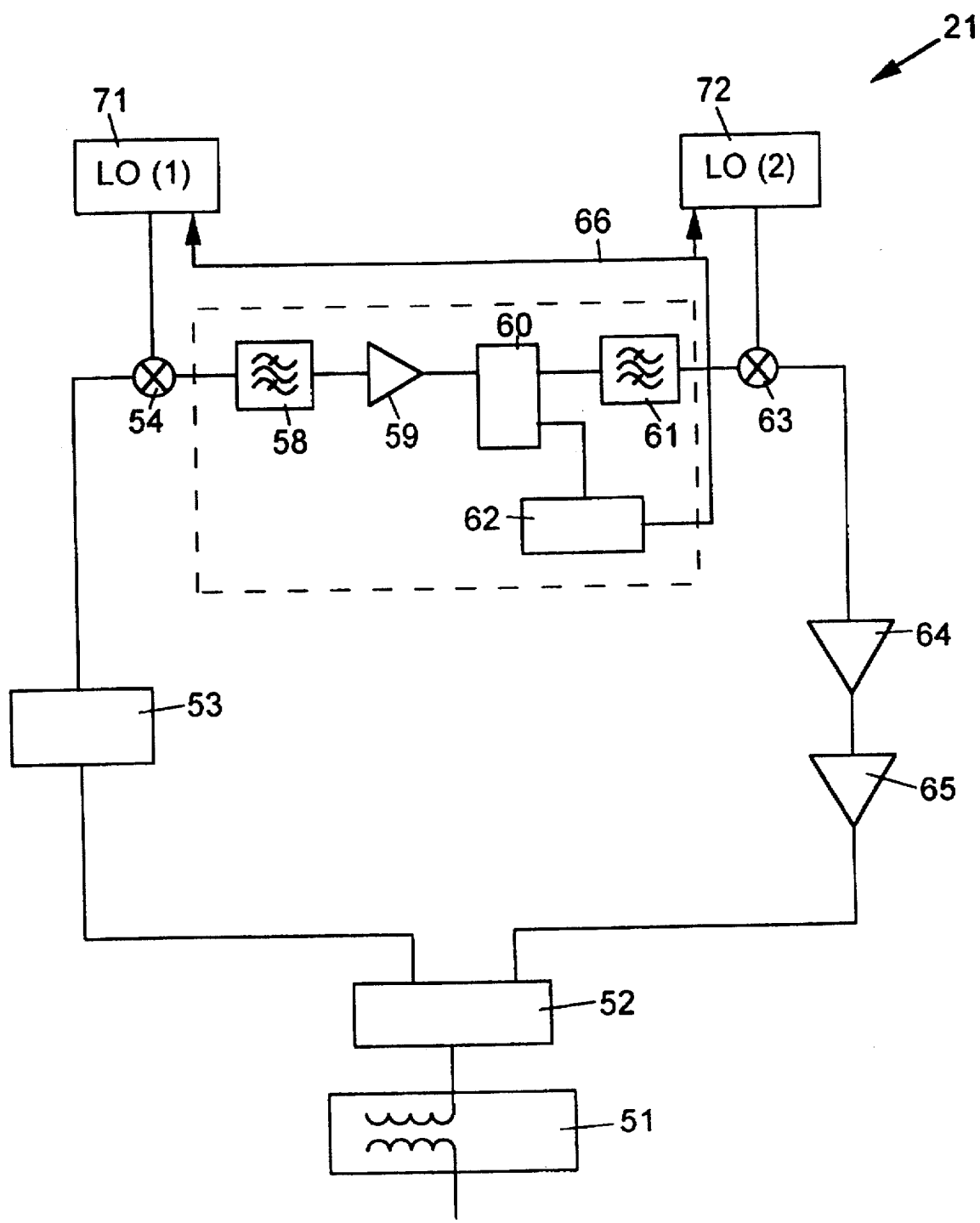
FIG. 6 shows an alternative embodiment of the repeater of FIG. 5.

FIG. 6 shows an alternative arrangement. Local oscillators 71, 72 are each connected directly to a mixer, LO(1) 71 to mixer 54, LO(2) 72 to mixer 63. Each of the local oscillators are capable of operating at the two required frequencies. Under the control of clock signal 66 the local oscillators switch between the two frequencies. This requires oscillators which can quickly settle following switching.

A typical overall gain of the repeater may be 30 dB, resulting from around 50 dB overall attenuation (30 dB at attenuator 53 and 20 dB lost in the filter and mixer stages) and 80 dB of gain (30 dB in the IF stage, 50 dB in the output stage). It is evident that other gains could easily be achieved.

Converting from $F_1 \rightarrow F_2$ or $F_2 \rightarrow F_1$ via an IF of the standard CT2 frequency band allows a standard CT2 terminal to be used as the clock extraction device, and minimises cost. However, this could be replaced by a dedicated terminal operating in a different frequency band, e.g. 70 MHz is often used in receivers.

The clock extraction device requires a continuous source of CT2 signals to ensure that the switching function is reliable. This can be achieved in several ways:

(i) one of the available CT2 channels is set aside for repeater use. Initially the head-end base station calls up the repeater terminal and the call remains connected for as long as the repeater is needed.

(ii) a tone is provided as a source of clock signals. The tone, which could be inside or outside the band being used for communications, may be amplitude modulated with the required clock signal.

(iii) the repeater terminal monitors calls in progress to extract the required clock signal. This is a more complicated solution and requires the terminal to hop between calls in progress. It also poses a problem in that when no calls are in progress there is not a clock signal source. This could be overcome by establishing 'dummy' calls solely for the purpose of synchronisation.

The solution which is most robust to disruptions, such as might be caused by lightning strikes, is that of providing a tone. After a disruption, option (i) requires a call to be re-established with the repeater terminal, whereas with option (ii) the repeater terminal simply detects the tone as soon as it returns.

A regenerator function could also be added to the repeater to clean up digital data received by the repeater before re-transmission along the mains cable. This may be necessary in view of the harsh environment that a mains cable poses for telecoms signal transmission.

The following are examples of frequencies which can be used in a system according to the invention.

Signal band $F_1$=6–10 MHz
Signal band $F_2$=12–16 MHz
CT2 band $F_{CT2}$=864–868 MHz
local oscillator (1) $F_{LO1}$=858 MHz
local oscillator (2) $F_{LO2}$=852 MHz Working through an example of frequency translation from $F_1 \rightarrow F_2$ via the CT2 band for clock extraction:

--- incoming signal $F_1$ = 6–10 MHz
at the first mixer convert $F_1 \rightarrow F_{LO1} + F_1$
$$= 858 + (6-10) \text{ MHz}$$
$$= 864 - 868 \text{ MHz}$$
$$= F_{CT2}$$
extract clock signal at $F_{CT2}$
at the second mixer convert $F_{CT2} \rightarrow F_{CT2} - F_{LO2}$
$$= (864-868)-852 \text{ MHz}$$
$$= 12-16 \text{ MHz}$$
$$= F_2 \text{ band}$$
outgoing signal at $F_2$

---

Figure 7:
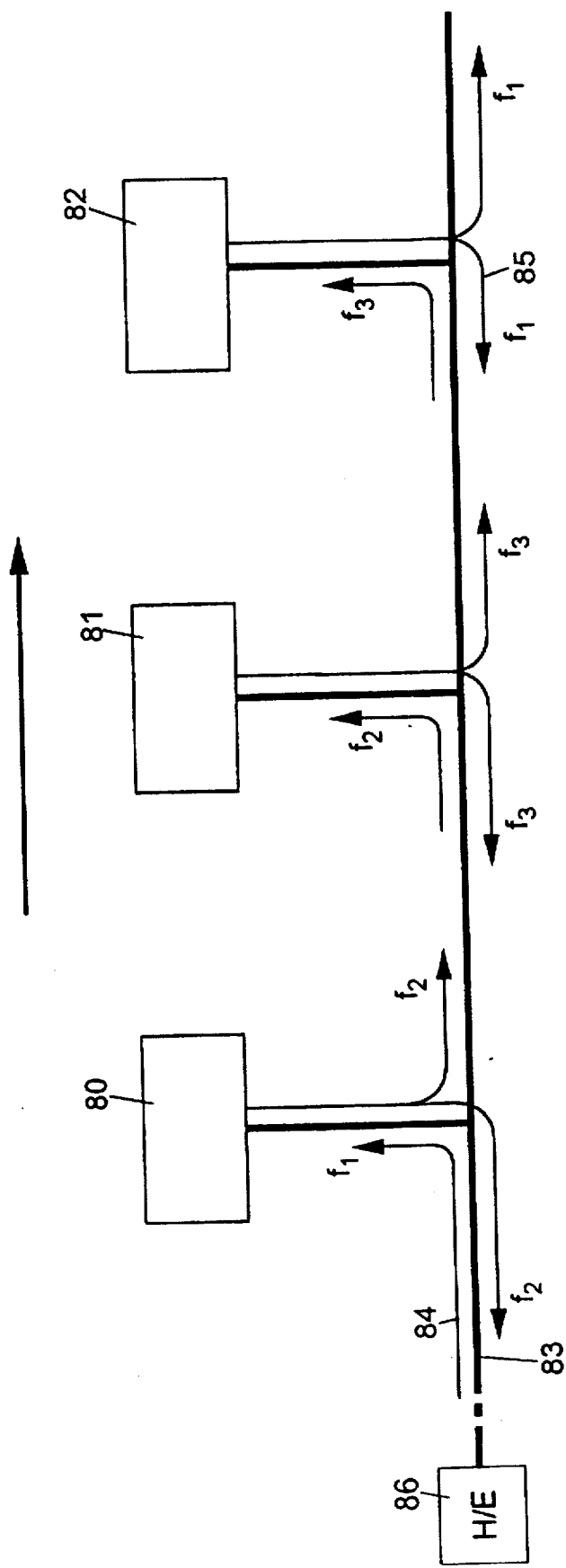
FIG. 7 shows a cascaded arrangement of repeaters according to an embodiment of the present invention.

Depending on the attenuation of a cable run, several repeaters may be needed. FIG. 7 shows an arrangement of repeaters 80,81,82 cascaded along mains cable 83 which runs from a head-end 86. The directions of signals relate to the downstream (head-end to subscribers) phase. A minimum of three different frequency bands are required for reliable cascaded operation, but this will allow any number of repeaters to be cascaded. Each repeater needs only to convert between two of the three frequency bands and therefore works in the same manner as described earlier, e.g. repeater 80 converts from $F_1 \rightarrow F_2$ and $F_2 \rightarrow F_1$.
repeater 81 converts from $F_2 \rightarrow F_3$ and $F_3 \rightarrow F_2$.
repeater 82 converts from $F_3 \rightarrow F_1$ and $F_1 \rightarrow F_3$.

Suitable local oscillator signals must be provided for these translations.

It is assumed that the attenuation of the cable sufficiently reduces the level of signal $F_1$ 84 arriving from the head-end such that it does not interfere with $F_1$ 85 as re-used downstream at repeater 82. If interference is a problem then additional frequency bands can be used. The set of frequency bands ($F_1, F_2, F_3 \ldots$) can be re-used along the cable run with further sets of repeaters.

I claim:

1. A method of amplifying signals passing along a transmission line at a carrier frequency comprising the steps of:
    tapping the signals from the line;
    converting the tapped signals to a different carrier frequency;
    amplifying the converted signals;
    coupling the amplified signals to the line for onward transmission at said different carrier frequency;
    wherein the signals are time division duplex signals which flow upstream and downstream along the line in alternate time periods, and wherein in the alternate periods the tapped signals are converted from a first to a second carrier frequency and from the second to the first carrier frequency.

2. A method of amplifying signals according to claim 1, further comprising extracting a clock signal from the tapped signals, relating to the upstream and downstream flows, to control timing of the converting step.

3. A method of amplifying signals according to claim 2 wherein the conversion between carrier frequencies is via an intermediate frequency (IF) at which the clock signal is extracted.

4. A method of amplifying signals according to claim 2 wherein the tapped signals comprise a band of channels, at least one of the channels conveying timing information from which the clock signal is extracted.

5. A method of amplifying signals according to claim 2 wherein the tapped signals comprise a band of channels supporting calls and the clock signal is extracted from one of the calls.

6. A repeater for use in a cabled communications system having a transmission line to carry signals, the repeater comprising:
    tapping means to tap signals at a carrier frequency from the line;
    converting means for converting the tapped signals to a different carrier frequency;
    an amplifier arrangement to amplify the converted signals, and;
    means for coupling the amplified signals to the line for onward transmission at said different carrier frequency;
    wherein the signals are time division duplex signals which in alternate time periods flow upstream and downstream along the line and in the alternate time periods the converting means converts the tapped signals from a first to a second carrier frequency and from the second to the first carrier frequency.

7. A repeater according to claim 6 further comprising extraction means for extracting from the tapped signals a clock signal relating to the upstream and downstream flows to control timing of the converting means.

8. A repeater according to claim 7 wherein the converting means converts between the first and second carrier frequencies via an intermediate frequency (IF) at which the clock signal is extracted.

9. A cabled communications system comprising a plurality of repeaters according to claim 6, the repeaters being arranged in cascade along the transmission line, each repeater converting between two carrier frequencies chosen from a set of frequencies.

10. A cabled communications system according to claim 9 wherein the set of frequencies is re-used along the transmission line with further arrangements of repeaters.

11. A repeater according to claim 6 wherein a regenerator function is provided in the repeater.

12. A repeater according to claim 6 wherein the transmission line is an electricity distribution cable which carries both telecommunications signals and an electricity supply.

* * * * *